(12) United States Patent  (10) Patent No.: US 9,011,104 B2
Delvaux et al.  (45) Date of Patent: Apr. 21, 2015

(54) ARTICLES HAVING DAMPING COATINGS THEREON

(75) Inventors: John McConnell Delvaux, Greer, SC (US); Yuk-Chiu Lau, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 757 days.

(21) Appl. No.: 12/652,788

(22) Filed: Jan. 6, 2010

(65) Prior Publication Data

US 2011/0162374 A1 Jul. 7, 2011

(51) Int. Cl.
| | |
|---|---|
| *B05D 3/02* | (2006.01) |
| *B63H 1/26* | (2006.01) |
| *C23C 4/10* | (2006.01) |
| *C04B 35/486* | (2006.01) |
| *C04B 35/488* | (2006.01) |
| *C23C 4/12* | (2006.01) |
| *F01D 5/16* | (2006.01) |
| *F01D 5/26* | (2006.01) |
| *F01D 5/28* | (2006.01) |

(52) U.S. Cl.
CPC ............... *C23C 4/10* (2013.01); *C04B 35/486* (2013.01); *C04B 35/488* (2013.01); *C04B 2235/3206* (2013.01); *C04B 2235/3208* (2013.01); *C04B 2235/3224* (2013.01); *C04B 2235/3225* (2013.01); *C04B 2235/3229* (2013.01); *C04B 2235/3232* (2013.01); *C04B 2235/3251* (2013.01); *C04B 2235/765* (2013.01); *C23C 4/105* (2013.01); *C23C 4/124* (2013.01); *C23C 4/127* (2013.01); *F01D 5/16* (2013.01); *F01D 5/26* (2013.01); *F01D 5/288* (2013.01); *Y02T 50/67* (2013.01); *F05D 2260/96* (2013.01)

(58) Field of Classification Search
USPC ..................... 427/376.2; 416/241 R
See application file for complete search history.

(56) References Cited

U.S. PATENT DOCUMENTS

| | | | | |
|---|---|---|---|---|
| 5,499,905 | A | * | 3/1996 | Schmitz et al. ........... 416/241 R |
| 5,750,272 | A | | 5/1998 | Jardine |
| 5,843,586 | A | * | 12/1998 | Schaeffer et al. ............ 428/633 |
| 5,993,980 | A | * | 11/1999 | Schmitz et al. ............... 428/633 |
| 7,285,312 | B2 | * | 10/2007 | Li ................... 427/567 |
| 2003/0059633 | A1 | * | 3/2003 | Ackerman et al. ............ 428/472 |
| 2003/0094598 | A1 | * | 5/2003 | Storer et al. ................. 252/500 |

(Continued)

FOREIGN PATENT DOCUMENTS

| | | |
|---|---|---|
| EP | 1026366 A1 | 8/2000 |
| JP | 2007211343 A | 8/2007 |

(Continued)

OTHER PUBLICATIONS

Ovejero, Elena, European Patent Application 10195581.3-1215, Extended European Search Report, Apr. 18, 2011, 10 pages.

(Continued)

*Primary Examiner* — Gerald L Sung
(74) *Attorney, Agent, or Firm* — Ernest G. Cusick; Hoffman Warnick LLC

(57) ABSTRACT

An article, such as a bucket, a blade, a nozzle, a vane, a strut, a fuel nozzle, a combustion casing, and a transition piece, the article having a damping coating comprising approximately 8 wt % to approximately 15 wt % $Y_2O_3$ and approximately 19 wt % to approximately 28 wt % $Ta_2O_5$ with the balanced weight of $ZrO_2$ is presented.

15 Claims, 3 Drawing Sheets

(56) References Cited

U.S. PATENT DOCUMENTS

| | | |
|---|---|---|
| 2005/0026770 A1 | 2/2005 | Zhu et al. |
| 2006/0023327 A1* | 2/2006 | Coombs et al. ............... 359/883 |
| 2006/0063351 A1* | 3/2006 | Jain ............................... 438/455 |
| 2008/0107920 A1 | 5/2008 | Rowe |
| 2009/0074961 A1 | 3/2009 | Kulkarni |
| 2009/0110953 A1* | 4/2009 | Margolies .................... 428/621 |

FOREIGN PATENT DOCUMENTS

| | | |
|---|---|---|
| JP | 2009052554 A | 3/2009 |
| JP | 2009108856 A | 5/2009 |

OTHER PUBLICATIONS

Huang et al., Microstructure and phase transformation of zirconia-based ternary oxides for thermal barrier coating applicants, Feb. 19, 2008, 12 pages, Springer Science+Business Media, LLC.

Raghavan et al., Thermal Properties of Zirconia Co-Doped With Trivalent and Pentavalent Oxides, May 25, 2000, 11 pages, Pergamon and Acta Materialia.

Pitek et al., Opportunities for TBCs in the ZrO2—YO1.5—TaO2.5 system, Jan. 3, 2007, 7 pages, Elsevier, ScienceDirect, and Surface and Coatings Technology.

EP Office Action dated Aug. 20, 2012 Application No. 10195581.3.

* cited by examiner

The invention relates generally to articles having a damping coating. More particularly, the invention relates to turbine engine articles, such as those exposed to hot gas and combustion processes, the turbine engine articles having a damping coating thereon.

Typically, turbine engines and articles therein are subjected to vibrational stresses due to the harsh environment that exists during operation of the turbine engine.

BRIEF DESCRIPTION OF THE INVENTION

A first aspect of the disclosure provides an article having a damping coating comprising approximately 8 weight (wt) % to approximately 15 wt % $Y_2O_3$ and approximately 19 wt % to approximately 28 wt % $Ta_2O_5$ with a balanced weight of $ZrO_2$.

A second aspect of the disclosure provides an article for exposure to a hot gas process in a turbine engine, the article having a damping coating comprising approximately 8 weight (wt) % to approximately 15 wt % $Y_2O_3$ and approximately 19 wt % to approximately 20 wt % $Ta_2O_5$ with a balanced weight of $ZrO_2$.

A third aspect of the disclosure provides an article for exposure to a combustion process in a turbine engine, the article having a damping coating comprising approximately 8 weight (wt) % to approximately 15 wt % $Y_2O_3$ and approximately 19 wt % to approximately 20 wt % $Ta_2O_5$ with a balanced weight of $ZrO_2$.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

DETAILED DESCRIPTION OF THE INVENTION

Current means for reducing vibrational stresses on turbine engines and articles therein have generally been mechanical in nature. Typical examples of mechanical means may include a spring-like damper inserted in a rotor structure beneath an airfoil platform, a damper included at an airfoil tip shroud, a pen damper, a chicklet damper, and/or a wafer damper. The foregoing damping methods may not be entirely effective, for example, when shank length (length from blade attachment to platform) decreases as is the case for modern turbine blade designs. Traditional damping means may also not be entirely effective for modes with displacement only in the outer span of an airfoil as is the case for new large turbine blade designs.

It has been discovered that an advantage that may be realized in the practice of some embodiments of damping coatings described herein is that a damping coating having ferroelastic characteristics and a composition described herein on the surface of the turbine engines and/or various articles therein reduce the vibrational stress on the foregoing significantly during operation of the turbine engine. The damping coating comprises a tantalum oxide doped yttria stabilized zirconia that exhibits ferroelastic domain switching under externally applied stress (such as vibrational stress) resulting in the dissipation of the applied stress, thereby providing damping capability to the turbine engine and/or articles therein.

It has also been discovered that an advantage that may be realized in the practice of some embodiments of damping coatings described herein is that the damping coatings reduce the vibration of the turbine engine and/or articles therein, thus altering vibrational characteristics in such a way as to increase the structural integrity and operational life of the turbine engine and/or articles therein. It has also been discovered that the resultant lowered fatigue stress and increased fatigue life allows for the design of a more efficient turbine engine and/or articles therein, for example, larger, thinner, and more efficient turbine airfoils.

Figure 1:
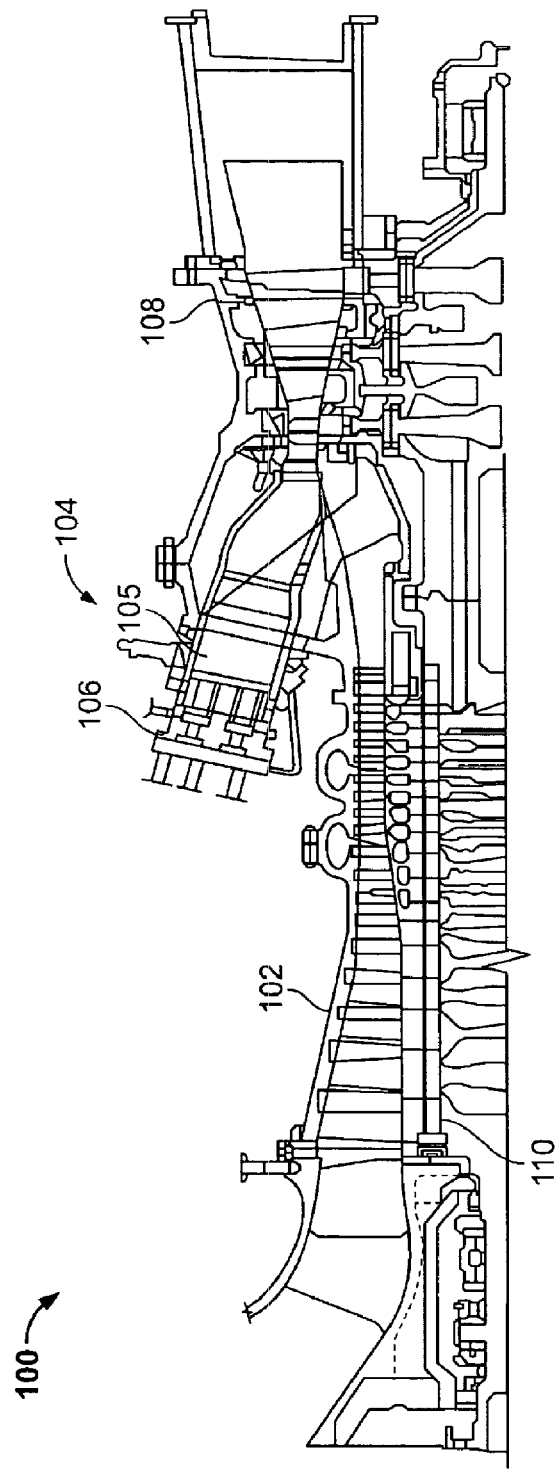
FIG. 1 shows a schematic illustration of an embodiment of a combustion turbine engine, in accordance with the present invention.

Referring to FIG. 1, a schematic illustration of an embodiment of a combustion turbine engine 100 is shown. Engine 100 includes a compressor 102 and a combustor 104. Combustor 104 includes a combustion region 105 and a fuel nozzle assembly 106. Engine 100 also includes a turbine 108 and a common compressor/turbine shaft 110 (sometimes referred to as rotor 110). In one embodiment, engine 100 is a MS7001FB engine, sometimes referred to as a 9FB engine, commercially available from General Electric Company, Schenectady, N.Y. The present invention is not limited to any one particular engine and may be used in connection with other engines including, for example, the MS7001FA (7FA) and MS9001FA (9FA), the GE 90, and the LMS100 engine models of General Electric Company. Other examples also include the F119 Pratt and Whitney military engine as well as the 8000H Siemens machine.

In operation, air flows through compressor 102 and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 for which gas stream thermal energy is converted to mechanical rotational energy. Turbine 108 is rotatably coupled to and drives rotor 110. Compressor 102 also is rotatably coupled to shaft 110. In the illustrative embodiment, there is a plurality of combustors 104 and fuel nozzle assemblies 106.

Figure 2:
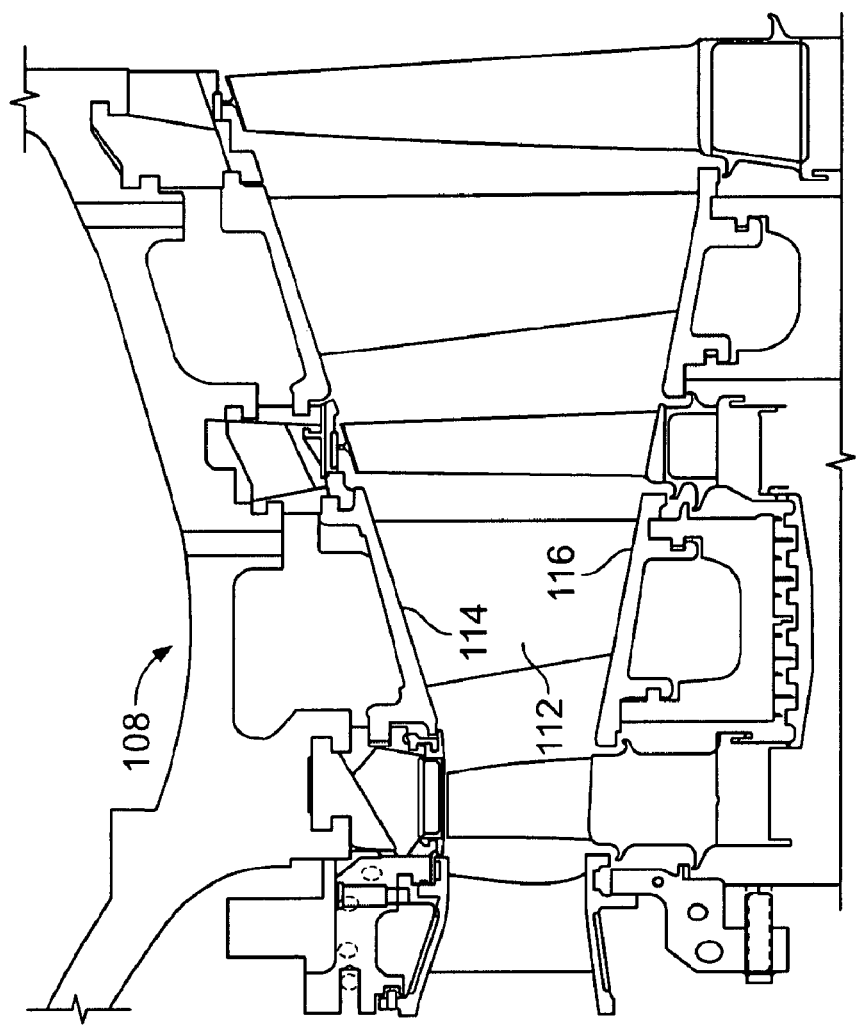
FIG. 2 shows a cross-section illustration of an embodiment of an illustrative gas turbine assembly with a three stage nozzle, in accordance with the present invention.

Referring to FIG. 2, a cross-section illustration of an embodiment of an illustrative turbine assembly 108 with a three stage nozzle that may be used with the combustion turbine engine 100 in FIG. 1 is shown. Turbine assembly 108 includes a vane sub-assembly 112. Vane sub-assembly 112 is held in the turbine assembly 108 by a radially outer platform 114 and a radially inner platform 116.

In an embodiment of the present invention, an article having a damping coating comprising approximately 8 weight (wt) % to approximately 15 wt % $Y_2O_3$ and approximately 19 wt % to approximately 28 wt % $Ta_2O_5$ with a balanced weight of $ZrO_2$ is presented. The term balanced weight is meant to connote that the remaining percentage, i.e., when the sum of the listed percentages of the components of the damping coating is subtracted from a total weight percent of 100, is the wt % of $ZrO_2$ present in the damping coating. For example in an embodiment of the damping coating described herein, if approximately 10 wt % of $Y_2O_3$ and approximately 20 wt % of $Ta_2O_5$ is present in the damping coating, then the balance weight of $ZrO_2$ present is 70 wt % [100−(10+20)].

In an embodiment, the article may be a part of an engine. In another embodiment, the engine may be an engine described in FIG. 1 and/or FIG. 2, or an engine having articles therein that may be capable of being coated with a damping coating described herein. In another embodiment, the engine may be selected from a group consisting of at least one of a gas turbine engine, a rocket engine, and a super sonic combustion ram (SCRAM) jet engine. In another embodiment, the engine may be a self sustaining combustion engine without rotating hardware.

In an embodiment, the engine articles may be articles described in FIG. 1 and/or FIG. 2, or engine articles that may be capable of being coated with a damping coating described herein. In another embodiment, the articles may be selected from the group consisting of at least one of an article for exposure to a hot gas process and/or a combustion process. In an embodiment, the article may selected from the group consisting of at least one of a bucket, a blade, a nozzle, a vane, a strut, a turbine casing, and a rotor. In another embodiment, the article may be selected from the group consisting of at least one of a fuel nozzle, a combustion casing, a combustion liner, and a transition piece.

The damping coatings of the present invention are not limited to any one particular turbine engine and/or articles therein, and may be used with other engines and/or articles therein. Additionally, damping coatings of the present invention may be used with other articles not described herein that may benefit from the ferroelastic properties of the damping coatings described herein.

In an embodiment, the damping coating used to coat the engines and/or engine articles described herein may comprise approximately 8 wt % to approximately 15 wt % $Y_2O_3$ and approximately 19 wt % to approximately 28 wt % $Ta_2O_5$ with a balanced weight of $ZrO_2$. In another embodiment, the damping coating may additionally comprise dopants, at least one of which may be selected from oxides and rare-earth oxides. In an embodiment, the oxides may be selected from the group consisting of at least one of CaO, MgO, and $TiO_2$. In another embodiment, the rare-earth oxides may be selected from the group consisting of at least one of $CeO_2$ and $Yb_2O_3$. In another embodiment, the oxides may be selected from the group consisting of at least one of CaO, MgO, $TiO_2$, $CeO_2$, and $Yb_2O_3$.

In an embodiment of the damping coating, the coating may comprise 72.76 wt % $ZrO_2$, 8.02 wt % $Y_2O_3$, and 19.22 wt % $Ta_2O_5$. In another embodiment, the damping coating may comprise 85.44 wt % $ZrO_2$, 7.49 wt % $Y_2O_3$, 4.4 wt % $TiO_2$, and 2.67 wt % $Ta_2O_5$. In another embodiment, the damping coating may comprise tetragonal zirconia.

In an embodiment, the damping coating has ferroelastic properties that provide vibrational damping at high temperatures by absorbing the vibrational stresses of the engine and/or engine articles therein. In an embodiment, the damping coating exhibits ferroelasticity at temperature in a range from approximately 700° C. to approximately 1350° C. In another embodiment, the damping coating exhibits ferroelasticity at approximately 760° C. Ferroelasticity is a phenomenon in which a material may exhibit a spontaneous strain. When a stress is applied to a ferroelastic material, a domain change will occur in the material from one orientation to an equally stable but different orientation (a 'twin' phase). This stress-induced phase change results in a spontaneous strain in the material.

The ferroelasticity property of the damping coating maybe characterized by the existence of a hysteresis loop between the strain $\epsilon$ and the applied stress. In the case of tetragonal zirconia, the c axis of the unit cell is approximately 1% to approximately 2% larger than the other two orthogonal axes, a and b (=a). An applied compressive stress (of the order of the coercive stress $\sigma_c$), e.g., induced by vibration stresses, along the c-axis can promote a ferroelastic transformation of the c-axis to one of the other two orthogonal axes with an accompanying ferroelastic strain which is proportional to the tetragonality ratio, c/a. The ferroelastic transformation does not occur as a simultaneous switching of all unit cells but rather proceeds by the transformation of domains with similar orientations.

In an embodiment of the damping coating, the coating may comprise other ferroelastic materials presently existing but not discussed in the specification or other ferroelastic materials yet to be discovered as long as the foregoing have the criteria that the c axis of the unit cell is approximately 1% to approximately 2% larger than the other two orthogonal axes, a and b (=a), and that a quotient of c divided by a is greater than 1. In another embodiment of the damping coating, the coating may comprise other tetragonal zirconia materials presently existing but not discussed in the specification or other tetragonal zirconia materials yet to be discovered as long as the foregoing have the criteria that the c axis of the unit cell is approximately 1% to approximately 2% larger than the other two orthogonal axes, a and b (=a), and a quotient of c divided by a is greater than 1.

Methods of forming the damping coatings described herein are known in the art and for the sake of clarity, no further discussion is provided.

In an embodiment of the present invention, damping coatings described herein may be applied to engines and/or engine parts described herein via thermal spray processes such as air plasma, high-velocity oxyfuel spray (HVOF), and vacuum plasma spray. In another embodiment, physical vapor deposition processes such as e-beam physical vapor deposition (EB-PVD) may be used. The foregoing processes are known in the art and for the sake of clarity, no further discussion is provided.

Figure 3:
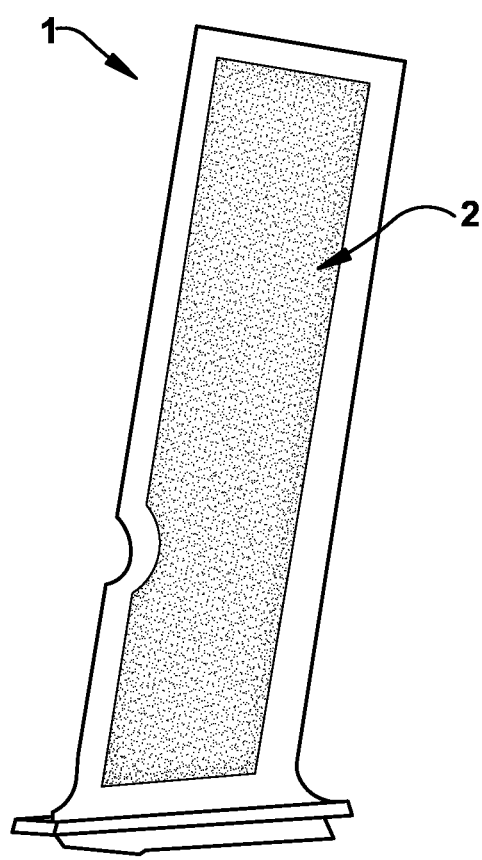
FIG. 3 shows a turbine bucket having a damping coating in an embodiment of an engine article, in accordance with the present invention.

Referring to FIG. 3, an embodiment of a turbine bucket 1 of an engine article having a damping coating 2 is shown. Various embodiments of the damping coating have been discussed herein and for the sake of clarity, no further discussion will be provided. In an embodiment, damping coating 2 (represented by the shaded area) may coat turbine bucket 2 in its entirety. In another embodiment, damping coating 2 may coat a selected surface area of turbine bucket 2.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "approximately" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to approximately 25 wt %, or, more specifically, approximately 5 wt % to approximately 20 wt %", is inclusive of the endpoints and all intermediate values of the ranges of "approximately 5 wt % to approximately 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An engine component having a damping coating comprising about 8 weight (wt) % to about 15 wt % $Y_2O_3$ and about 19 wt % to about 28 wt % $Ta_2O_5$ with a balanced weight of $ZrO_2$,
   wherein the damping coating includes tetragonal zirconia,
   wherein a c axis of a unit cell of the tetragonal zirconia is about 1% to about 2% larger than orthogonal axes a and b of the unit cell, and
   wherein the c axis of the unit cell is configured to transform to at least one of orthogonal axes a or b in response to an applied stress,
   wherein the damping coating exhibits ferroelasticity and further includes at least one of: CaO, or $CeO_2$, and wherein the balanced weight of $ZrO_2$ excludes the at least one of CaO or $CeO_2$.

2. An engine component according to claim 1, wherein the transformation of the unit cell of the tetragonal zirconia forms a ferroelastic strain in the damping coating.

3. An engine component according to claim 1, wherein the engine is selected from the group consisting of at least one of a gas turbine, a rocket engine, and a super sonic ram jet engine.

4. An engine component according to claim 1, wherein the article is selected from the group consisting of at least one of an article for exposure to a hot gas process and an article for exposure to a combustion process.

5. An engine component according to claim 4, wherein the article is selected from the group consisting of at least one of a bucket, a blade, a nozzle, a vane, a strut, a turbine casing, and a rotor.

6. An engine component according to claim 4, wherein the article is selected from the group consisting of at least one of a fuel nozzle, a combustion casing, a combustion liner, and a transition piece.

7. An engine component according to claim 1, wherein the coating exhibits ferroelastic domain switching in response to applied stress.

8. An engine component according to claim 7, wherein a quotient of the c axis divided by the orthogonal axis a is greater than 1.

9. An engine component according to claim 1, wherein the coating exhibits ferroelasticity at temperatures in a range from about 700° C. to about 1350° C.

10. An engine component according to claim 1, wherein the coating exhibits ferroelasticity at about 760° C.

11. An article for exposure to a hot gas process in a turbine engine, the article having a damping coating comprising about 8 weight (wt) % to about 15 wt % $Y_2O_3$ and about 19 wt % to about 20 wt % $Ta_2O_5$ with a balanced weight of $ZrO_2$,
    wherein the damping coating includes tetragonal zirconia,
    wherein a c axis of a unit cell of the tetragonal zirconia is about 1% to about 2% larger than orthogonal axes a and b of the unit cell, and
    wherein the c axis of the unit cell is configured to transform to at least one of orthogonal axes a or b in response to an applied stress, the transformation forming a ferroelastic strain in the damping coating,
    wherein the damping coating additionally comprises dopants at least one of which is selected from at least one of CaO or $CeO_2$, and wherein the balanced weight of $ZrO_2$ excludes the at least one of CaO or $CeO_2$.

12. An article according to claim 11, wherein the article is selected from the group consisting of at least one of a bucket, a blade, a nozzle, a vane, a strut, a turbine casing, and a rotor.

13. An article according to claim 11, wherein the coating exhibits ferroelasticity at temperatures in a range from about 700° C. to about 1350° C., and the ferroelastic strain is proportional to a tetragonality ratio of the unit cell.

14. An article for exposure to a combustion process in a turbine engine, the article having a damping coating comprising about 8 weight (wt) % to about 15 wt % $Y_2O_3$ and about 19 wt % to about 20 wt % $Ta_2O_5$ with a balanced weight of $ZrO_2$,
    wherein the damping coating includes tetragonal zirconia,
    wherein a c axis of a unit cell of the tetragonal zirconia is about 1% to about 2% larger than orthogonal axes a and b of the unit cell, and
    wherein the c axis of the unit cell is configured to transform to at least one of orthogonal axes a and b in response to an applied stress, the transformation forming a ferroelastic strain in the damping coating,
    wherein the coating additionally comprises dopants at least one of which is selected from at least one of CaO or $CeO_2$, and wherein the balanced weight of $ZrO_2$ excludes the at least one of CaO or $CeO_2$.

15. An article according to claim 14, wherein the article is selected from the group consisting of at least one of a fuel nozzle, a combustion casing, a combustion liner, and a transition piece.

* * * * *